United States Patent [11] 3,551,584

| [72] | Inventor | Ellsworth S. Rose<br>8266 Stevenson Ave., Sacramento, Calif. 95828 |
|---|---|---|
| [21] | Appl. No. | 833,917 |
| [22] | Filed | June 17, 1969 |
| [45] | Patented | Dec. 29, 1970 |

[54] CABLE DUCT OR RACEWAY AND SUPPORT FOR PARTITION WALLS
10 Claims, 4 Drawing Figs.

[52] U.S. Cl. .................................................... 174/49; 52/221
[51] Int. Cl. .................................................... H02g 3/28
[50] Field of Search............................................ 174/48, 49, 57, 101; 52/220, 221; 220/3.7

[56] References Cited
UNITED STATES PATENTS
| 1,718,254 | 6/1929 | Putnam ........................ | 174/49X |
| 2,808,136 | 10/1957 | Hammitt et al. ............. | 52/221X |

Primary Examiner—Lewis H. Myers
Assistant Examiner—D. A. Tone
Attorney—Alexander B. Blair ABSTRACT: A readily movable cable duct or raceway which also serves to support full height or partial height partition walls in office buildings and the like. The structure is modular and has readily removable face plates for easy access. A locator rail for the partition wall to be supported is provided on the top of the raceway.

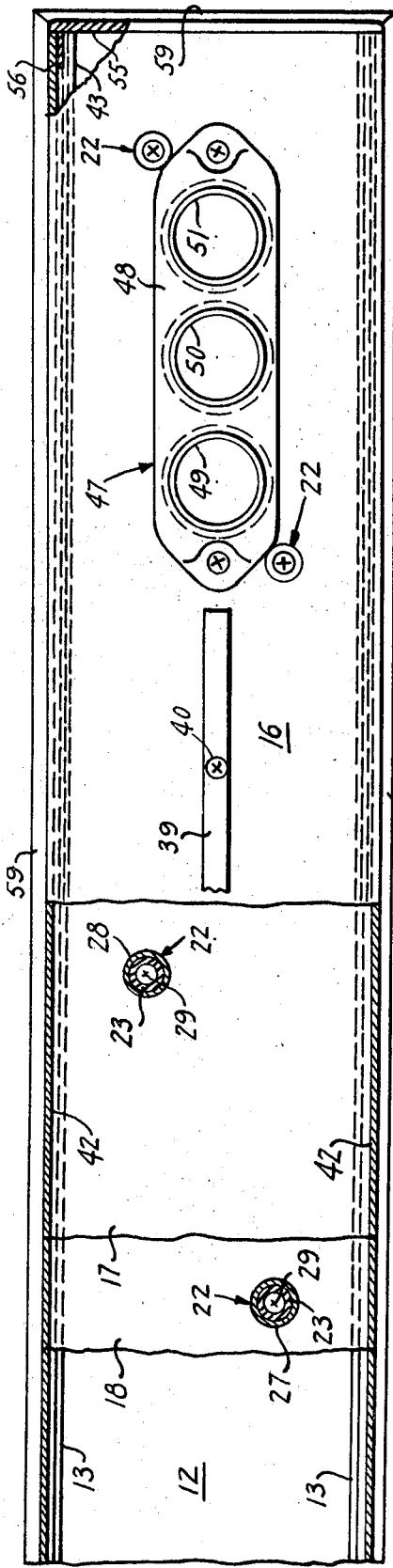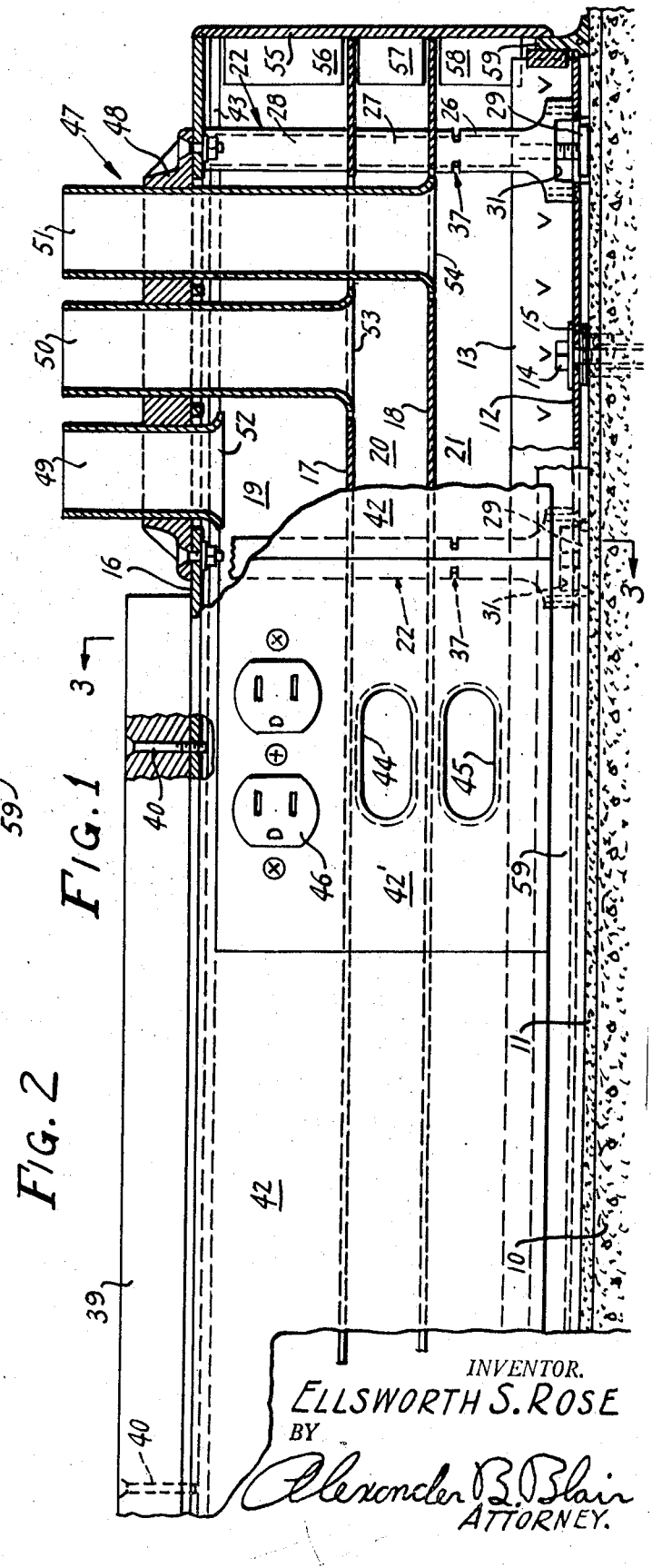

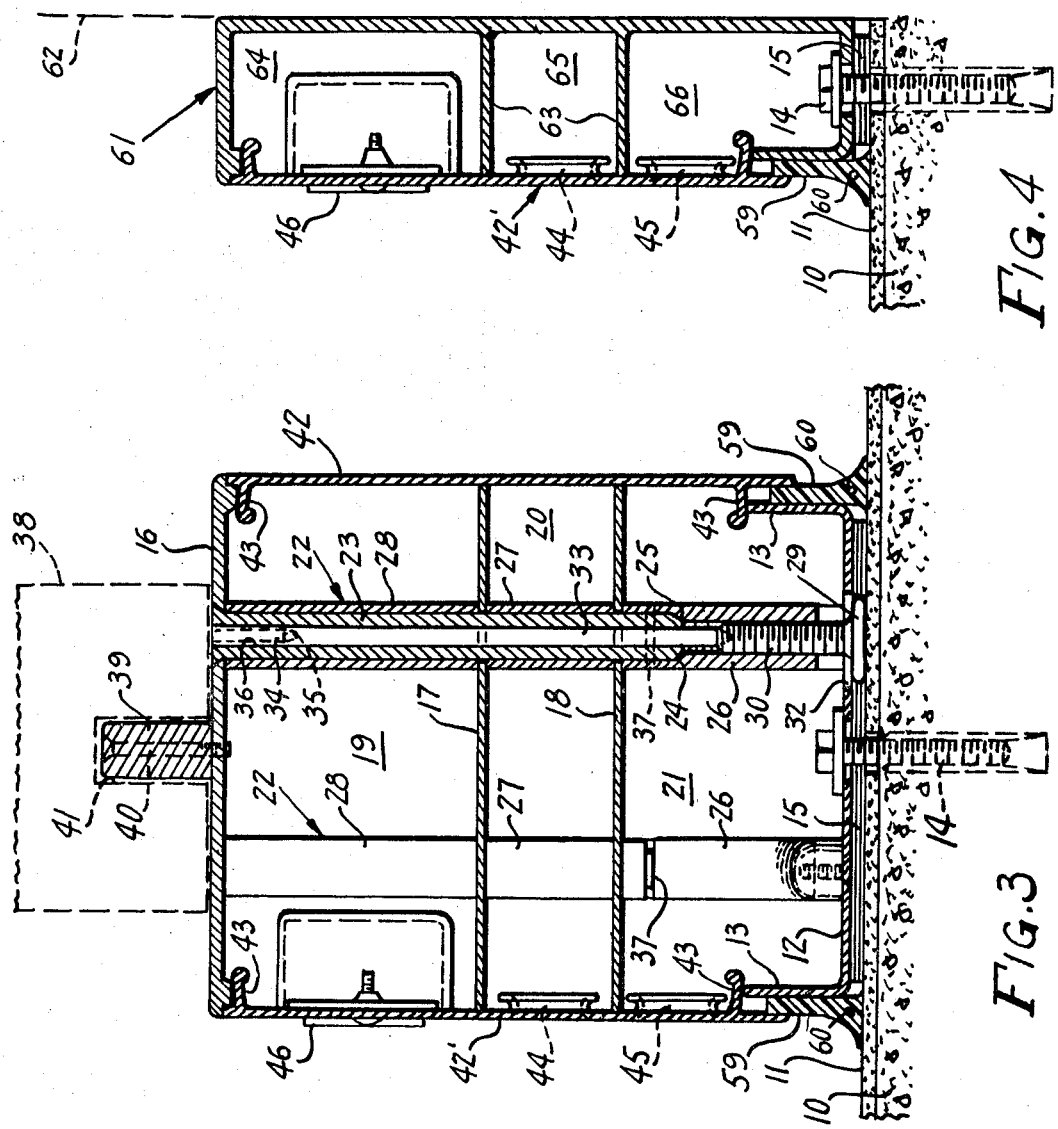

CABLE DUCT OR RACEWAY AND SUPPORT FOR PARTITION WALLS

BACKGROUND OF THE INVENTION

The need for the invention arises in connection with the constant remodeling of office space in modern office buildings. As is well known, the needs of tenants are widely varied and the changing of tenants in office buildings requires very frequent relocating of partition walls and doorways. This can be very difficult and costly particularly where electrical cables are enclosed in concrete floors, often necessitating the opening of floors to relocate the cables.

In accordance with the present invention, the above difficulties are substantially overcome by the provision of modular, readily movable ducts or raceways which contain all of the power, telephone and intercom cables with adequate outlets for all service locations. The ultimate in capacity for office type services is provided. The raceway has the capability of supporting directly thereon the office partition walls which may be ceiling high or the partial height type, in some instances. By virtue of this arrangement, the raceway sections and the partition walls are readily movable to accommodate any floor plan without defacing the building or even spoiling the carpeting of a particular area. The invention is ideally suited to buildings having suspended-type ceilings with readily removable tiles enabling the wiring leading into the invention units to be placed in the ceiling rather than in the floor. Metal extrusions are employed at all applicable points in the assembly and the raceway contains built-in adjustable support columns making the invention unit capable of bearing any expected load within reasonable limits. The unit is neat and attractive and can be made compatible with decorator color schemes through the use of anodized face plates. Other features and advantages of the invention will be apparent during the course of the following description.

BRIEF DESCRIPTION OF DRAWING FIGURES

FIG. 1 is a side elevational view, partly in vertical section, of a cable raceway and partition wall support embodying the invention.

FIG. 2 is a plan view of the structure shown in FIG. 1.

FIG. 3 is a transverse vertical section taken substantially on line 3–3 of FIG. 1.

FIG. 4 is a similar sectional view showing a modified portion of the structure employed in certain areas.

DETAILED DESCRIPTION OF PREFERRED EMBODIMENT

Referring to the drawings in detail, wherein like numerals designate like parts, the numeral 10 designates a concrete floor or the like in a building upon which the invention raceway and support is to be installed, said floor having a covering 11 of tile or carpet. The invention proper comprises a base plate 12 of channel form, FIG. 2, having upturned side flanges 13. At intervals, the base plate 12 is anchored to the floor by slender conventional anchor bolts 14 and adjacent to these anchor bolts, suitable shims 15 are interposed between the base plate 12 and the flooring, if shims are needed.

The structure further embodies a top cover plate 16 which may be extruded and a pair of intervening flat horizontal partition plates 17 and 18 which serve to divide the structure horizontally into three continuous raceway compartments 19, 20 and 21. The top cover plate 16 and the partition plates 17 and 18 are supported in parallel spaced relation at intervals along the raceway structure by sturdy adjustable columns or posts 22 which form important elements of the invention. These posts or columns 22 are staggered laterally, FIG. 2, and are provided in regularly spaced relation along the entire length of the structure. As will be fully described, these columns render the raceway capable of supporting an entire ceiling high partition wall along the full length of the raceway.

Each column 22 embodies a preferably steel tubular locking shaft 23, FIG. 3, having its lower beveled end 24 inserted within an internally threaded lower steel sleeve or spacer 26. A beveled shoulder 25 on this spacer is spaced from the beveled end 24 to insure positive tightening of each column 22. Additional tubular spacers 27 and 28 engage over the shaft 23, as shown, to maintain the plate elements 16, 17 and 18 in properly spaced relation. Each column 22 further comprises at its lower end a floor-engaging support foot 29 having a screw-threaded shaft 30 engaging within the threaded bore of lower spacer 26 adjustably. A void 31 for the foot 29 is provided. The base plate 12 has a clearance opening 32 adjacent each foot 29. The threaded shaft 30 has a reduced diameter shank or rod 33 extending upwardly through the bore of tubular shaft 23 to an elevation near and below the top of this shaft, as indicated at 34. At its upper end, the shank 33 has a recess 35 to receive a conventional phillips head screwdriver for adjustment. A longer recess 36 in the top of shank 33 leads to the recess 35 to shorten installation time. The top of tubular shaft 23 is flared as shown in FIG. 3 and is also flush with the top of cover plate 16. The two tubular elements 28 and 27 are locked against relative axial movement by a conventional spring steel locking ring 37. By this means, the effective height of each post 22 is constant between the base plate 12 and cover plate 16 but the height between the bottom of base plate 12 and uneven floor surfaces 10 and 11 is compensated for by adjustment of the foot 29. Other forms of vertically adjustable columns or posts may be employed, if preferred.

The several adjustable steel columns 22, above-described, form the weight bearing components of the movable raceway or duct system, rendering the same capable of supporting throughout its entire length a ceiling high or a partial height partition wall 38 which may be conventionally bolted to the cover plate 16, if desired. However, for ease of installation, the cover plate 16 has mounted thereon a preferably continuous extruded partition alignment rail 39 secured at spaced intervals to the cover plate by screws 40. This alignment rail simply engages within a longitudinal groove 41 in the lower face of the partition wall 38, as shown in broken lines in FIG. 3, to securely position the partition wall upon the raceway structure. FIG. 3 shows that the staggered series of adjustable posts 22 are spaced apart laterally a proper distance to afford maximum support directly under the partition wall. The alignment rail 39 and the floor anchor bolts 14 are located at the transverse center of the raceway.

For easy access to the interior of the raceway and for imparting thereto full cable lay-in capability, the opposite vertical side walls of the structure are formed by extruded snap-in snap-out face plates 42 of convenient length, each having inwardly facing somewhat resilient flanges 43 thereon. At suitable intervals along the structure, service outlet snap-in snap-out face plates 42' are provided having suitable outlets 44 and 45 for intercom and telephone cables, respectively, which cables are laid within the chambers 20 and 21. Each face plate 42' also has provision for the mounting of a duplex power receptacle 46 electrically connected with the power cable laid in the chamber or compartment 19 on the partition plate 17. These outlet facilities are repeated at required intervals along the length of the raceway which length is a variable. Full modular design and maximum service capacity is thus afforded. Also the cables may be laid into the raceway compartments from either side of the structure having the removable face plates. Another very important feature of the invention structure is that the component parts are almost one hundred per cent reusable in subsequent remodeling of offices and the like.

The raceway structure further embodies a service cable entrance assembly 47 comprising a sturdy mounting plate 48 fixedly secured to the raceway cover plate 16 near one end thereof and carrying inlet guide tubes 49, 50 and 51 for the respective power, intercom and telephone lines. As shown in FIG. 1, the lower ends of these tubes 49, 50 and 51 terminate at the tops of the respective compartments 19, 20 and 21 with their flared terminal ends 52, 53 and 54 flush with the adjacent horizontal partition walls or plates 17 and 18. If additional incoming capacity is required in a long unit of the invention, additional service entrance assemblies 47 may be installed. In this way, the invention possesses great flexibility or versatility as will be appreciated by those skilled in the art.

Each end of the raceway unit is equipped with a suitable end cover plate 55, preferably of the type which snaps into place and carrying flange parts 56, 57 and 58 which interfit with partition walls or plates 17 and 18, FIG. 1. To provide a neat and attractive finish around the margins of the raceway structure at the floor level, hard rubber or plastic mopping strips 59 preferably reinforced by rods 60 are provided. These mopping strips have their upper edges disposed between the side flanges 13, FIG. 3, and the lower edge portions of the removable side face plates. Other minor details of construction need not be described for a proper understanding of the invention. The modular raceway and partition wall support unit lends itself ideally to almost any floor plan in an office and the entire partition wall and the supporting raceway with its cables and outlets is readily movable to a new location when remodeling is desired. Except for the detachment of the floor anchor bolts 14, no disfiguring of the floor is involved. The invention quite obviously lends itself ideally to a situation where wiring is located in a suspended ceiling with the wires fed downwardly through the partition wall and into the guide tubes 49, 50 and 51 of the entrance assembly.

FIG. 4 shows a modification wherein a more slender raceway is achieved in some cases, without the use of the adjustable columns 22. In FIG. 4, the body 61 of the raceway is made as a single extrusion which also serves as a supporting column for a partition wall 62 or the like. Integral horizontal divider partitions 63 are formed on the body 61 producing compartments 64, 65 and 66 for power, intercom and telephone service cables. The same anchor bolts 14 and shims 15, previously described, are employed, as well as the same mopping strip 59 and removable service face plates 42' and 42, all previously described in connection with the previous embodiment. In the invention shown in FIG. 4, the removable side face plates are provided on one side only of the structure. The overall use or purpose of the device is the same as previously described.

Additional advantages of the invention may be mentioned, namely, the absence of awkward service pedestals under the feet of employees, rendering floor areas safer and easier to clean. Most important is the fact that the use of the raceway or duct above the floor allows reduction in floor thickness necessary when service cables are housed within the floor slab.

I claim:

1. A cable raceway structure and partition wall support comprising a base member, means for anchoring the base member to a floor, a top cover plate, plural spaced horizontal partition plates intermediate the base member and top cover plate, plural vertically adjustable floor-engaging column members at spaced intervals along the raceway structure and support and carrying the top cover plate and partition plates and adapted to bear the direct weight of a partition wall resting on the top cover plate, a service cable entrance assembly on the top cover plate at least at one location thereon, and readily removable side face plates on said structure and wall support including service outlet means.

2. The structure of claim 1, and said column members include screw-threaded extension means having floor engaging feet, said column members staggered laterally along said structure and support and positioned laterally inside of the structure and support so as to be directly beneath a partition wall resting on the top cover plate.

3. The structure of claim 1, and a partition wall locator rail on the top cover plate extending lengthwise thereof to interfit with a recess in the lower edge of a partition wall.

4. The structure of claim 1, and said service cable entrance assembly including a mounting plate resting upon the top cover plate and plural substantially vertical cable entrance guide tubes secured to the mounting plate with their lower ends terminating near the levels of the partition plates and top cover plate in vertically stepped relation.

5. The structure of claim 1, and said readily removable face plates provided on both sides of said structure and support and having snap-in engagement with the top cover plate and base member, and service receptacle and outlet elements carried by selected face plates along the length of said structure and support and communicating with cable lay-in compartments between said partition plates, base member and top cover plate.

6. The structure of claim 5, and said base member being a longitudinal channel member having upturned side flanges, and mopping strips extending along the lower side edges of the structure and support and being clamped between the upturned flanges and snap-in face plates.

7. The structure of claim 1, and said means for anchoring said base member comprises floor-embedded anchor bolts at spaced intervals along said base member substantially at the transverse center thereof.

8. The structure of claim 7, and spacing shims intervened between the base member and floor at each anchor bolt.

9. The structure of claim 2, and each column member having plural tubular spacers thereon whose ends engage and establish the proper spacing of said partition plates relative to the top cover plate and said base member.

10. The structure of claim 1, and an end cover plate for said raceway structure and support removably engaging said partition plates.